Patented Dec. 27, 1949

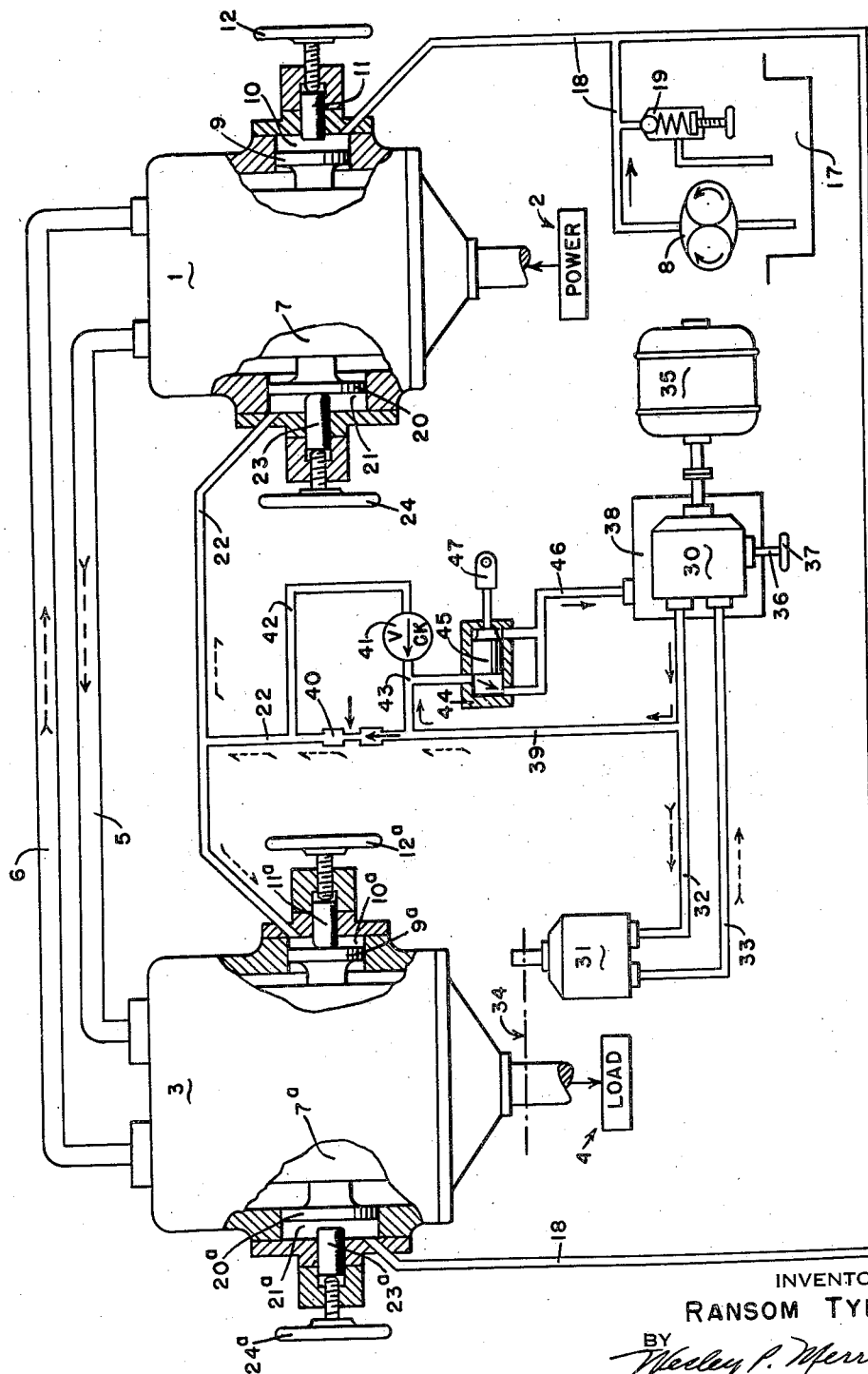

2,492,720

UNITED STATES PATENT OFFICE 2,492,720

HYDRAULIC DRIVE AND SPEED CONTROL MEANS THEREFOR

Ransom Tyler, Greenfield, Wis., assignor to The Oilgear Company, Milwaukee, Wis., a corporation of Wisconsin Application June 11, 1945, Serial No. 598,822

11 Claims. (Cl. 60—53)

This invention relates to hydraulic drives of the type which includes a rotary hydraulic motor for driving a machine or an element of a machine, a pump for supplying liquid to the motor to energize it, and means for controlling the speed of the machine.

Certain machines are operable through a wide range of speeds and require a high driving torque at low speeds but require only a moderate torque at high speeds. Such a machine should be gradually accelerated to a speed which may either be substantially constant or be proportional to a reference speed.

The present invention has as an object to provide a hydraulic drive which is particularly adapted for driving a machine of the above type.

Another object is to provide a hydraulic drive capable of exerting a high torque through one part of a speed range and maintaining a constant power output through another part of the speed range.

Another object is to provide a hydraulic drive which will accelerate a machine or other driven element to and maintain it at a speed which may either be substantially constant or be proportional to a reference speed.

Another object is to provide a hydraulic drive of the above character which is susceptible of close adjustment and control.

A drive constructed according to the invention has the advantage that its pump may be considerably smaller than the pump which would ordinarily be required.

Other objects and advantages will be apparent from the following description of a drive embodying the invention and shown schematically in the accompanying drawing.

The drive chosen for illustration includes a pump 1 which is adapted to be driven at a substantially constant speed from a prime mover or other power source 2, a motor 3 which is adapted to be connected to a machine or other load 4 to drive the same, and two fluid channels 5 and 6 which connect pump 1 and motor 3 to each other and form therewith a hydraulic circuit.

Pump 1 is ordinarily mounted upon or connected to a suitable reservoir and provided with means for supplying liquid from the reservoir to the return side of the circuit to make up leakage losses and to keep the circuit flooded. Since such pumps are well known and in extensive use, pump 1 has not been illustrated in detail. It is deemed sufficient to state herein that pump 1 has a displacement varying member or slide block 7 which is shiftable between a neutral or zero displacement position and a maximum displacement position, and that pump 1 when driven will deliver liquid through channel 5 to motor 3 at a rate proportional to the distance that slide block 7 is off set from its neutral position.

Slide block 7 is ordinarily urged toward its neutral position by a substantially constant force. As shown, slide block 7 is urged toward neutral by a low constant pressure created by a gear pump 8 and acting upon a piston 9 which engages slide block 7 and is fitted in a cylinder 10 carried by the pump casing.

The movement of slide block 7 toward the right is limited in a suitable manner. As shown, piston 10 is adapted to engage a stop 11 fitted in the end wall of cylinder 10 and engaged by a screw 12 which may be adjusted to stop slide block 7 from moving farther toward the right when it has reached any desired position. In the present instance, screw 12 is ordinarily adjusted to stop slide block 7 in its maximum displacement position.

Gear pump 8 is ordinarily driven in unison with pump 1 and arranged within the casing thereof according to the usual practice but, for the purpose of illustration, it has been shown separate from pump 1 and as drawing liquid from a reservoir 17 and discharging it into a branched low pressure channel 18 one branch of which is connected to cylinder 10.

Reservoir 17 is ordinarily the same reservoir from which pump 1 is supplied with liquid but for the purpose of illustration it has been shown separate from pump 1.

Gear pump 8 discharges liquid in excess of requirements and the excess liquid is exhausted through a relief valve 19 which enables pump 8 to maintain in channel 18 and in cylinder 10 a substantially constant low pressure equal to the resistance of relief valve 19.

Slide block 7 is adapted to be moved toward the right by liquid acting upon a piston 20 which engages slide block 7 and is fitted in a cylinder 21 carried by the pump casing. Liquid for operating piston 20 is supplied to cylinder 21 through a channel 22 in response to operation of a control mechanism as will presently be explained.

Movement of slide block 7 toward the left is limited in any suitable manner such as by a stop 23 which is fitted in the end wall of cylinder 21 and adapted to be engaged by piston 20. Stop 23 is positioned by means of a screw 24 which may be adjusted to cause stop 23 to prevent slide block 7 from moving farther toward the left when it reaches any desired position. In the present instance, screw 24 is ordinarily adjusted to stop slide block 7 in its neutral or zero displacement position.

Motor 3 has been shown as being of the same type as pump 1 and as having the same type of displacement varying mechanism. Therefore, correspond parts have been indicated by corresponding reference numerals with the exponent "a" added to the numerals applied to the parts of motor 3.

That is, motor 3 has a displacement varying member or slide block 7a, a piston 9a fitted in a cylinder 10a and adapted to move slide block 7a toward the left against a stop 23a fitted in the end of a cylinder 21a and adjusted by means of a screw 24a, and a piston 20a fitted in cylinder 21a and adapted to move slide block 7a toward the right against a stop 11a fitted in the end of cylinder 10a and adjusted by means of a screw 12a.

An increase in displacement is effected by movement of slide block 7a toward the right the same as in pump 1, but instead of slide block 7a being constantly urged toward the left by gear pump liquid and adapted to be moved toward the right in response to operation of the control mechanism as is pump slide block 7, it is constantly urged toward the right and initially held in a maximum displacement position by gear pump liquid supplied through a branch of channel 18 to cylinder 21a and acting upon piston 20a, and it is adapted to be moved toward the left to decrease motor displacement by liquid supplied by the control mechanism through channel 22 to cylinder 10a and acting upon piston 9a as will presently be explained.

The maximum movements of slide block 7a are determined by screws 12a and 24a which may be adjusted to stop slide block 7a in any two desired positions. In the present instance, screw 12a is ordinarily adjusted to stop slide block 7a from moving farther toward the right when it reaches a position at which motor displacement is maximum, and screw 24a is ordinarily adjusted to stop slide block 7a from moving toward the left beyond a minimum displacement position such as a position at which motor displacement is about one fourth of maximum.

Liquid for operating pistons 20 and 9a is supplied by a control transmission including a pilot pump 30. a pilot motor 31, a channel 32 through which pump 30 delivers liquid to motor 31 and a channel 33 through which liquid is returned from motor 31 to pump 30.

Pilot motor 31, which may have means for varying its displacement but which has been shown as a constant displacement motor, is driven in unison with main motor 3 as by being driven from the main motor shaft through a suitable drive 34.

Pilot pump 30 may be driven in unison with main pump 1 as by being connected by a suitable drive to the drive shaft of pump 1 or by being driven directly from power source 2. Since pump 1 is ordinarily driven at a substantially constant speed, pump 30 when driven in unison with pump 1 would have a speed as nearly constant as is necessary for most commercial uses.

However, since motor 3 may be located a considerable distance from pump 1 and since the control transmission ordinarily employed is a commercial type in which the pump and the motor are arranged within a single casing, pilot pump 30 has been shown as being driven by an electric motor 35 which operates at a substantially constant speed.

Pilot pump 30 is preferably of the variable displacement type and provided with a suitable control for varying its displacement. As shown, it is provided with a control stem 36 rotation of which changes pump displacement. Stem 36 may be rotated through a reduction gear by a small electric motor adapted to be controlled from a remote point in a manner which is well known as such motor controls are in extensive commercial use but, for the purpose of illustration, stem 36 has been shown as being adapted to be rotated by a handwheel 37 fixed thereto.

Liquid for keeping the hydraulic circuit of the control transmission flooded may be supplied from reservoir 17 by gear pump 8 but the control transmission is ordinarily provided with its own reservoir, such as the reservoir 38, and provided with means for supplying pump 30 with liquid from that reservoir according to the usual practice.

The control transmission has its pressure channel 32 connected by a channel 39 to channel 22 through a flow restricting means such as an adjustable orifice choke 40 which limits the rate at which liquid may flow from the control transmission to channel 22 and thereby limits the rate at which the main pump displacement is increased and the rate at which the main motor displacement is decreased.

In order that main pump displacement may be rapidly decreased and main motor displacement may be rapidly increased, a check valve 41 is connected in parallel with choke 40 to permit liquid to flow freely from channel 22 to the control transmission and to prevent flow from the control transmission to channel 22 except through choke 40. As shown, check valve 41 has its inlet connected to channel 22 by a channel 42 and its outlet connected to channel 39 by a channel 43.

The drive may be started and stopped by means of a valve which when open will short circuit pilot pump 30. As shown, a branch of channel 43 is connected to a valve casing 44 having a valve 45 fitted therein to control communication between channel 43 and a channel 46 which discharges into the reservoir from which pump 30 is supplied with liquid, such as reservoir 38.

Valve 45 may be shifted in any suitable manner such as by having its stem connected to a clevis 47 which may be connected to a lever for local operation or connected to an electromagnet for operation from a remote point.

*Operation*

With the parts in the positions shown and the pumps running, pump 30 is bypassed through valve casing 44, as indicated by the small full arrows, and gear pump 8 is maintaining pressure in cylinder 10 and causing piston 9 to hold pump 1 at zero displacement so that no liquid is discharged by pump 1 and motor 3 is idle. Gear pump 8 is also maintaining pressure in cylinder 21a and causing piston 20a to hold motor 3 at maximum displacement.

The drive is started in operation by shifting valve 45 to stop the flow of liquid into exhaust channel 46 and then, since pilot motor 31 is idle so that liquid cannot enter it, the liquid discharged by pump 30 must flow, as indicated by the small dotted half arrows, through channel 39 and choke 40 into channel 22 at the rate determined by choke 40. If at this time pump 30 should discharge liquid at a rate in excess of the rate at which liquid can flow through choke 40, the excess liquid would be exhausted through a relief valve which, as is customary in power pumps, is arranged within the pump casing and hence would not appear in the drawing.

The liquid delivered through choke 40 to channel 22 creates therein a pressure which acts upon pistons 20 and 9a and tends to move them but piston 20 has a much larger effective pressure area than piston 9a so that piston 20 will move pump slide block 7 toward the right from its neutral position toward its maximum displacement position while piston 20a will continue to hold motor 3 at maximum displacement. Slide block 7 in moving toward the right will cause piston 9 to expel liquid from cylinder 10 through gear pump relief valve 19.

As soon as slide block 7 moves from its neutral position, pump 1 will start to discharge liquid at a rate proportional to the distance that slide block 7 is moved from its neutral position. The liquid discharged by pump 1 will flow through channel 5 to motor 3 and cause it to drive load 4 and to return liquid to pump 1 through channel 6, the flow of liquid in the main circuit being indicated by large dotted arrows. Since piston 20a is holding slide block 7a in its maximum displacement position, motor 3 is capable of exerting its maximum torque.

Pilot motor 31 will start to operate in unison with motor 3 and it will transfer liquid from channel 32 to channel 33 as indicated by the small dotted arrows but, since it at first operates at a very slow speed, all of the liquid discharged by pilot pump 30 cannot pass through it. Consequently, liquid will continue to flow through channel 39, choke 40 and channel 22 to cylinder 21 and cause piston 20 to gradually increase the displacement of pump 1 and thereby increase the rate at which pump 1 delivers liquid to motor 3 which is thus gradually accelerated and gradually increases the speed of pilot motor 31.

If the displacement of pilot pump 30 is relatively small and remains unchanged, the displacement of pump 1 and the speed of motor 3 will be gradually increased in the above manner until motor 3 is driving pilot motor 31 just fast enough to enable it to consume all of the liquid discharged by pilot pump 30 so that there is no excess liquid for effecting further operation of piston 20. Then the speed of motor 3 will remain substantially constant as long as the speed of pilot pump 30 remains substantially constant.

If the displacement of pilot pump 30 is initially large enough or if it is gradually increased to a predetermined maximum after the drive starts to operate, pump 30 will continue to deliver liquid faster than motor 31 can consume it. Consequently, liquid will continue to flow through channel 39, choke 40 and channel 22 to cylinder 21 and cause piston 20 to gradually increase the displacement of pump 1 and thereby gradually increase the speed of motor 3 until the displacement of pump 1 becomes maximum. Motor 3 is capable of exerting its maximum torque during this part of its speed range for the reason that its displacement remains maximum.

When the displacement of pump 1 becomes maximum, piston 9 engages stop 11 and prevents further adjustment of pump 1. Then the pressure created by pump 30 will rise and the liquid delivered to channel 22 will enter cylinder 10a and cause piston 9a to shift slide block 7a toward the left to gradually decrease the displacement of motor 3.

When a motor is supplied with liquid at a constant rate and at a constant pressure, decreasing motor displacement causes a corresponding increase in motor speed and a corresponding decrease in motor torque. Therefore, gradually shifting slide block 7a toward the left causes motor 3 to gradually accelerate and to exert a gradually decreasing torque so that its power output remains substantially constant after slide block 7a starts to move.

Motor 3 will gradually accelerate until it is driving pilot motor 31 just fast enough to enable it to consume all of the liquid discharged by pilot pump 30 so that there is no excess liquid for effecting further operation of piston 9a. Then the speed of motor 3 will remain substantially constant as long as the speed and displacement of pilot pump 30 remains substantially constant.

After the drive has been brought up to speed, it may be decelerated by decreasing the speed or the displacement of pilot pump 30 and then pump 30 will not discharge enough liquid to supply pilot motor 31. Enough liquid to make up the difference between the requirements of motor 31 and the output of pump 30 will then be drawn by motor 31 through channels 32, 39 and 43, check valve 41 and channels 42 and 22 from cylinder 21 if the drive is then operating in the lower part of its speed range or from cylinder 10a if the drive is then operating in the upper part of its speed range.

Drawing liquid from cylinder 21 permits gear pump pressure acting upon piston 9 to move slide block 7 toward the left to reduce the displacement of pump 1 and thereby decrease the speed of motor 3. Drawing liquid from cylinder 10a permits gear pump pressure acting upon piston 20a to move slide block 7a toward the right to increase the displacement of motor 3 and thereby decrease the speed of motor 3.

Pilot motor 31 will decelerate in unison with motor 3 until its volumetric intake is just equal to the volumetric output of pump 30 so that no more liquid can escape from cylinder 21 or from cylinder 10a. Then the speed of motor 3 will remain substantially constant as long as the speed and the displacement of pilot pump 30 remains substantially constant.

If after the drive has been brought up to such a speed that pilot motor 31 consumes liquid just as fast but no faster than pilot pump 30 discharges liquid, the speed of main motor 3 will be maintained proportional to the speed of pilot pump 30 regardless of whether pump 1 is driven at a constant speed or at a variable speed.

For example, if the speed of motor 3 should tend to decrease or if the speed of pump 30 should be increased, pilot motor 31 will not be driven fast enough to consume all of the liquid discharged by pump 30 and the excess liquid would operate the displacement varying mechanism, as explained above, to cause motors 3 and 31 to accelerate until the volumetric intake of pilot motor 31 exactly equalled the volumetric output of pilot pump 30. Conversely, if the speed of motor 3 should increase or if the speed of pump 30 should decrease, motor 31 would consume more liquid than was discharged by pump 30 and the deficiency would be made up by liquid drawn from cylinder 21 or cylinder 10a so that the displacement of pump 1 would automatically decrease or the displacement of motor 3 would automatically increase, as explained above, and thereby decelerate motors 3 and 31 until the volumetric intake of motor 31 exactly equalled the volumetric output of pump 30.

A drive constructed according to the invention thus maintains its output speed proportional to a reference speed regardless of whether the reference speed is constant or variable, it is capable of operating through a wide range of speeds, and it is capable of exerting a substantially constant torque through one part of its speed range and maintaining a substantially constant power output during another part of the speed range.

The drive set forth herein is susceptible of various modifications and adaptations without departing from the scope of the invention which is hereby claimed as follows:

1. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, speed control means for effecting operation of said first servo-motor, and means responsive to said pump member reaching a predetermined maximum displacement position for causing said speed control means to effect operation of said second servo-motor.

2. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, speed control means adapted when effective to effect operation of said first servo-motor, means responsive to said pump member reaching a predetermined maximum displacement position for causing said speed control means to effect operation of said second servo-motor, and means for rendering said speed control means effective or ineffective.

3. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, speed control means for effecting operation of said first servo-motor, means responsive to said pump member reaching a predetermined maximum displacement position for causing said speed control means to effect operation of said second servo-motor, and means for limiting the rate at which said servo-motors are operated.

4. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a stop for preventing further movement of said pump member after it reaches a predetermined maximum displacement position, a second servo-motor adapted when operated to move said motor member in a direction to decrease motor displacement, and means for supplying pressure liquid to said servo-motors to effect operation thereof, said servo-motors and said yielding means being so proportioned that said first servo-motor will first move said pump member to said predetermined maximum displacement position and then said second servo-motor will move said motor member toward its minimum displacement position.

5. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a stop for preventing further movement of said pump member after it reaches a predetermined maximum displacement position, a second servo-motor adapted when operated to move said motor member in a direction to decrease motor displacement, means for supplying pressure liquid to said servo-motors to effect operation thereof, said servo-motors and said yielding means being so proportioned that said first servo-motor will first move said pump member to said predetermined maximum displacement position and then said second servo-motor will move said motor member toward its minimum displacement position, and means for limiting the rate at which liquid is supplied to said servo-motors to thereby limit the rates at which said members are moved.

6. In a hydraulic drive including a pump adapted to be driven from a source of power and having a member shiftable to vary pump displacement, and a motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a stop for preventing further movement of said pump member after it reaches a predetermined maximum displacement position, a second servo-motor adapted when operated to move said motor member in a direction to decrease motor displacement, means for supplying pressure liquid to said servo-motors to effect operation thereof, said servo-motors and said yielding means being so proportioned that said first servo-motor will first move said pump member to said predetermined maximum displacement position and then said second servo-motor will move said motor member toward its minimum displacement position, means for limiting the rate at which liquid is supplied to said servo-motors to thereby limit the rates at which said members are moved, and means for permitting liquid to escape freely from said servo-motors.

7. In a hydraulic drive including a main pump adapted to be driven from a source of power and having a member shiftable to vary pump displacement, and a main motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, a pilot pump driven at a reference speed, a pilot motor driven in unison with said main motor, a fluid channel connecting the outlet of said pilot pump to the inlet of said pilot motor, and means responsive to said pilot pump discharging liquid in excess of the liquid that can enter said pilot motor for first directing excess liquid to said first servo-motor to cause it to move said pump member to a predetermined position and for thereafter directing additional excess liquid if any to said second servo-motor to effect operation thereof.

8. In a hydraulic drive including a main pump adapted to be driven from a source of power and having a member shiftable to vary pump displacement, and a main motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, a pilot pump driven at a reference speed, a pilot motor driven in unison with said main motor, a fluid channel connecting the outlet of said pilot pump to the inlet of said pilot motor, and channel means connecting said fluid channel to both of said servo-motors so that any difference between the volumetric output of said pilot pump and the volumetric input of said pilot motor causes liquid to flow to or from one or both of said servo-motors to effect operation therof, said servo-motors being so proportioned relative to each other and to said yielding means that liquid delivered thereto operates said first servo-motor through a predetermined distance before it operates said second servo-motor.

9. In a hydraulic drive including a main pump adapted to be driven from a source of power and having a member shiftable to vary pump displacement, and a main motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, a pilot pump driven at a reference speed, a pilot motor driven in unison with said main motor, a fluid channel connecting the outlet of said pilot pump to the inlet of said pilot motor, channel means connecting said fluid channel to both of said servo-motors so that any difference between the volumetric output of said pilot pump and the volumetric input of said pilot motor causes liquid to flow to or from one or both of said servo-motors to effect operation thereof, said servo-motors being so proportioned relative to each other and to said yielding means that liquid delivered thereto operates said first servo-motor through a predetermined distance before it operates said second servo-motor, and a start and stop valve adapted to short circuit said pilot pump and to connect said servo-motors to exhaust.

10. In a hydraulic drive including a main pump adapted to be driven from a source of power and having a member shiftable to vary pump displacement, and a main motor hydraulically connected to said pump to be energized by liquid therefrom and having a member shiftable to vary motor displacement, the combination of yielding means for urging said pump member toward and normally holding it in a position in which pump displacement is zero, yielding means for urging said motor member toward and normally holding it in a position in which motor displacement is maximum, a first servo-motor adapted when operated to move said pump member toward a position in which pump displacement is maximum, a second servo-motor adapted when operated to move said motor member in a direction to decrease motor displacement, a pilot pump driven at a reference speed, a pilot motor driven in unison with said main motor, a fluid channel connecting the outlet of said pilot pump to the inlet of said pilot motor, channel means connecting said fluid channel to both of said servo-motors so that any difference between the volumetric output of said pilot pump and the volumetric input of said pilot motor causes liquid to flow to or from one or both of said servo-motors to effect operation thereof, and a choke and a check valve connected into said channel means in parallel with each other to limit the rate of liquid flow to said servo-motors and to permit unrestricted flow therefrom, said servo-motors being so proportioned relative to each other and to said yielding means that liquid delivered thereto operates said first servo-motor through a predetermined distance before it operates said second servo-motor.

11. In a drive including a main pump having a displacement varying member shiftable between maximum and zero displacement positions, a main hydraulic motor connected in series with said pump and having a displacement varying member shiftable between maximum and minimum displacement positions, and means for continuously driving said pump, the combination of a first servo-motor for urging said motor member to its maximum displacement position, a second servo motor for urging said pump member to its zero displacement position, means for supplying each of said servo-motors with liquid at a substantially constant pressure, a third servo-motor for moving said motor member toward its minimum displacement position, a fourth servo-motor for moving said pump member toward its maximum displacement position and having an effective pressure area greater than that of said third servo-motor, means for stopping said pump member in its maximum displacement position, a pilot pump driven at a substantially constant speed, a pilot motor driven in unison with said main motor, fluid channels connecting the outlet of said pilot pump to the inlet of said pilot motor and to said third and fourth servo-motors so that liquid delivered by said pilot pump in excess of that consumed by said pilot motor will flow to said fourth servo-motor and cause it to increase the displacement of said main pump to its maximum and then cause said third servo-motor to decrease the displacement of said main motor, means for adjusting the displacement of said pilot pump to thereby regulate the speed of said main motor, and a start and stop valve connected to said channels for bypassing said pilot pump.

RANSOM TYLER.

REFERENCES CITED

The following references are of record in the file of this patent:

UNITED STATES PATENTS

| Number | Name | Date |
|---|---|---|
| 1,656,544 | Thoma | Jan. 17, 1928 |
| 2,192,539 | Condon | Mar. 5, 1940 |
| 2,255,963 | Benedek | Sept. 16, 1941 |

FOREIGN PATENTS

| Number | Country | Date |
|---|---|---|
| 19,452 | Great Britain | Aug. 31, 1911 |
| 222,647 | Great Britain | Oct. 9, 1924 |
| 519,686 | Germany | Mar. 3, 1931 |